(12) United States Patent
Inoue et al.

(10) Patent No.: US 7,856,956 B2
(45) Date of Patent: Dec. 28, 2010

(54) SPARK IGNITION ENGINE

(75) Inventors: Kunihiko Inoue, Osaka (JP); Toru Takemoto, Osaka (JP)

(73) Assignee: Yanmar Co., Ltd., Osaka-shi, Osaka (JP)

( * ) Notice: Subject to any disclaimer, the term of this patent is extended or adjusted under 35 U.S.C. 154(b) by 330 days.

(21) Appl. No.: 12/066,942

(22) PCT Filed: Aug. 30, 2006

(86) PCT No.: PCT/JP2006/317070
§ 371 (c)(1),
(2), (4) Date: May 7, 2008

(87) PCT Pub. No.: WO2007/032206
PCT Pub. Date: Mar. 22, 2007

(65) Prior Publication Data
US 2009/0133667 A1  May 28, 2009

(30) Foreign Application Priority Data
Sep. 15, 2005  (JP) .............................. 2005-268090

(51) Int. Cl.
*F02M 1/00* (2006.01)
*F02P 1/00* (2006.01)
(52) U.S. Cl. .................... 123/267; 123/169 R; 313/123
(58) Field of Classification Search ................. 123/267, 123/169; 313/123
See application file for complete search history.

(56) References Cited
U.S. PATENT DOCUMENTS 4,071,001 A * 1/1978 Goto ........................... 123/260
4,072,134 A * 2/1978 Noguchi et al. ............. 123/260
5,224,449 A * 7/1993 Fukano et al. ............... 123/267
5,554,908 A   9/1996 Kuhnert et al.

(Continued)

FOREIGN PATENT DOCUMENTS

CN    2054218 U    7/1990

(Continued)

OTHER PUBLICATIONS

International Search Report for International Application No. PCT/JP2006/317070, Japanese Patent Office, mailed Dec. 12, 2006, 2 pgs.

(Continued)

*Primary Examiner*—John T Kwon
(74) *Attorney, Agent, or Firm*—Sterne, Kessler, Goldstein & Fox P.L.L.C.

(57) ABSTRACT

A spark ignition engine capable of operating even with a leaner air-fuel mixture to achieve stable ignition and combustion performance. An ignition plug is fitted to a cylinder head through a sleeve, and the ignition electrode of the ignition plug is disposed in a cylinder, facing a single chamber type combustion chamber. The sleeve is formed in a blind cylindrical shape, an auxiliary chamber storing the ignition electrodes of the ignition plug is formed at the bottom part of the sleeve, and a nozzle hole allowing the auxiliary chamber to communicate with the combustion chamber is formed in the bottom part of the sleeve. The bottom part of the sleeve is projected from an explosion surface to the inside of the combustion chamber and the position of ignition by the ignition electrode is set near the explosion surface.

3 Claims, 9 Drawing Sheets

U.S. PATENT DOCUMENTS 5,947,076 A * 9/1999 Srinivasan et al. .......... 123/267
2005/0268882 A1* 12/2005 Robinet et al. .............. 123/254

FOREIGN PATENT DOCUMENTS

| DE | 101 44 976 A1 | * | 4/2003 |
|----|---------------|---|--------|
| GB | 478929 | * | 1/1938 |
| JP | 51-12803 | | 1/1976 |
| JP | 56-42115 | | 10/1981 |
| JP | 57-66224 | | 4/1982 |
| JP | 1-15862 | | 5/1989 |
| JP | 04-287826 | | 10/1992 |
| JP | 4-287826 | | 10/1999 |
| JP | 11-280628 | | 10/1999 |
| JP | 2003-278547 | | 10/2003 |
| JP | 2004-204835 | | 7/2004 |
| WO | WO 2004/036013 A1 | | 4/2004 |
| WO | WO 2004/036014 A2 | | 4/2004 |

OTHER PUBLICATIONS

Patent Abstracts of Japan, abstract of Publication No. JP 04-287826, Spark Ignition Internal Combustion Engine of Auxiliary Chamber, published Oct. 13, 1992, (listed on accompanying PTO/SB/08A as document FP5).

Patent Abstracts of Japan, abstract of Publication No. 11-280628, Ignition Timing Controller for Internal Combustion Engine, published Oct. 15, 1999, (listed on accompanying PTO/SB/08A as document FP6).

Supplemental Search Report for European Appl. No. 06797044, European Patent Office, mailed Apr. 9, 2009, 3 pgs.

European Search Opinion for European Appl. No. 06797044, European Patent Office, mailed Apr. 9, 2009, 5 pgs.

* cited by examiner

Prior Art

FIG. 16

Prior Art

SPARK IGNITION ENGINE

BACKGROUND OF THE INVENTION

1. Field of the Invention

The present invention relates to spark ignition engines comprising a single chamber type combustion chamber.

2. Background Art

Figure 15:
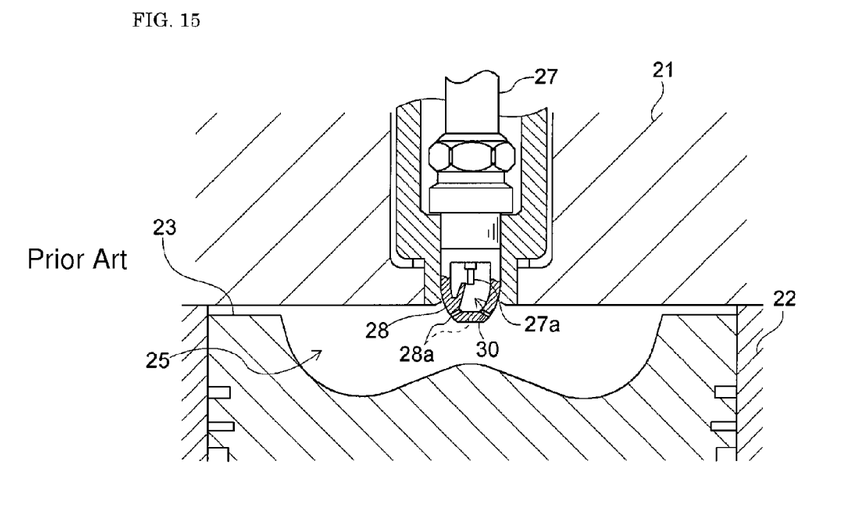
FIG. 15 is a cross-section view of the conventional combustion chamber comprising the auxiliary chamber type ignition plug.
Figure 16:
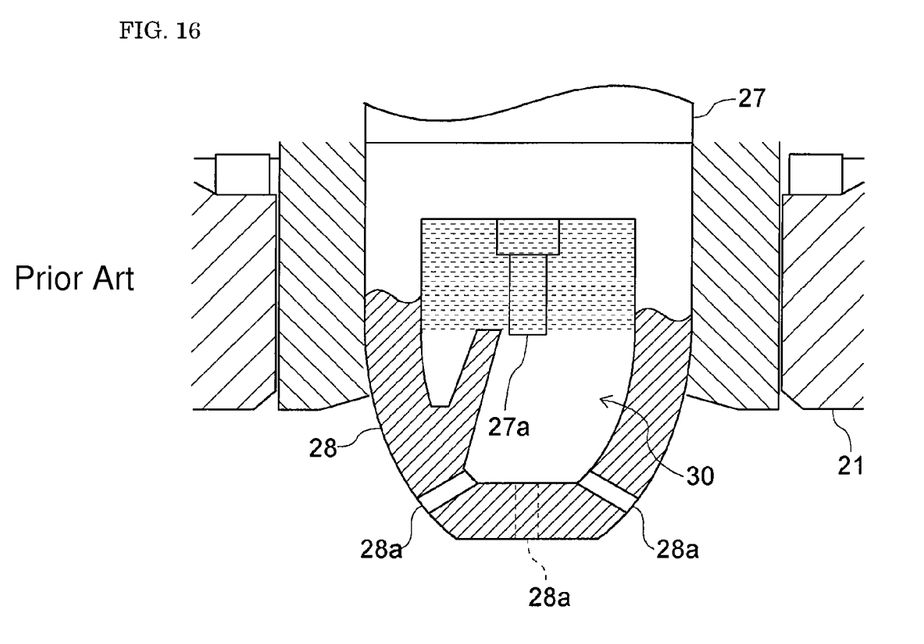
FIG. 16 is an enlarged cross-section view of the conventional auxiliary chamber.

Conventionally, in order to achieve the stable ignition performance even with the leaner air-fuel mixture, the spark ignition engine comprising the single chamber type combustion chamber comprises an ignition plug, which is provided in an auxiliary chamber without fuel supply (e.g. see JP-A-4-287826). In the spark ignition engine like this, as shown in FIGS. 15 and 16, a combustion chamber 25 is formed between a cylinder head 21 and the top of a piston 23 installed in a cylinder 22, and an ignition plug 27 is provided in the cylinder head 21 in such a way that ignition electrodes 27*a* are disposed over the combustion chamber 25. A cap 28 having a plurality of nozzle holes 28*a* is provided at the tip of the ignition plug 27 so as to cover the ignition electrodes 27*a*, and an auxiliary chamber 30 is thus formed in the cap 28, communicated with the combustion chamber 25 through the plurality of nozzle holes 28*a*. Therefore, when the air-fuel mixture flowed into the auxiliary chamber 30 from the cylinder 22 is spark-ignited with the ignition electrodes 27*a* of the ignition plug 27, the flame blown off out of the plurality of nozzle holes 28*a* becomes a flame jet. The flame jet makes the turbulence and is transmitted into the combustion chamber 25. As a result, the air-fuel mixture in the combustion chamber 25 is fully combusted. Hence, the turbulence generated by the flame jet makes the rapid combustion possible.

BRIEF SUMMARY OF THE INVENTION

Problems to Be Solved By the Invention

With respect to the conventional spark ignition engine, the auxiliary chamber is formed at the tip of the lower portion of the ignition plug, provided with the cap formed in the blind cylindrical shape. Thus, the diameter of the auxiliary chamber is limited by the diameter of the ignition plug. So, in order to secure the effective volume in the auxiliary chamber, the height thereof has to be higher. Therefore, the height of the auxiliary chamber becomes much longer than the width thereof, such that the length between the position of ignition by the ignition electrodes and the nozzle holes provided at the lower portion of the auxiliary chamber, makes it easy for the residual gas is easy to remain around the position of ignition. As a result, the ignition in the auxiliary chamber or the flame expansion is prevented by the effect of the residual gas, so that the stable ignition and combustion performance with leaner air-fuel mixture is difficult to achieve.

The objective of the present invention is to provide a spark ignition engine capable of operating with a leaner air-fuel mixture to achieve stable ignition and combustion performance.

Means of Solving the Problems

The objective of the present invention is described above. The means of solving the problem are described below.

In accordance with the present invention, a spark ignition engine comprising a cylinder, a cylinder head, a piston, a sleeve formed in the blind cylindrical shape, an auxiliary chamber formed at the bottom part of the sleeve, an ignition plug fitted to the cylinder head through the sleeve, a set of ignition electrodes of the ignition plug facing a single chamber type combustion chamber in the cylinder and one or more nozzle hole allowing the auxiliary chamber to communicate with the combustion chamber, characterized in that the bottom of the sleeve is projected to the inside of the combustion chamber from an explosion surface of the cylinder head; and the ignition position by the ignition electrodes is set near the explosion surface.

Preferably, the auxiliary chamber is formed in the cylindrical shape and is surrounded by the sleeve and the ignition plug, and in that the ratio of the height of the auxiliary chamber to the diameter of the same is set within the range of 0.5 to 1.0.

Preferably, the position of ignition is set in the lower side than the residual gas that remains in the auxiliary chamber at ignition timing before the piston reaches top dead center.

Preferably, the ratio of the length between the inside upper surface of the auxiliary chamber and the position of ignition to the height of the auxiliary chamber is set within the range of 0.5 to 0.8.

Preferably, the ratio of the volume of the auxiliary chamber to that of the combustion chamber when the piston reaches top dead center is set within the range of 0.010 to 0.015.

Preferably, the nozzle holes are set as one or more pairs of the holes symmetrical relative to the position of ignition, and in that the angle that each of the pair of the holes makes in the gravity direction is set within the range of 80 to 100 degrees.

Preferably, the directions of the nozzle holes are set as the directions of the lines between the position of ignition and the centers of valve recesses provided in the outer periphery of the combustion chamber or the centers of the valve recesses adjacent to each other, and in that the tolerance angles that the directions of the nozzle holes and the directions of the lines make are set within the range of −10 to 10 degrees in the horizontal direction.

Effect of the Invention

The effects of the present invention are described below.

According to the present invention, the standard ignition plugs can be used for the spark ignition engine and cost reduction can be achieved. The flame jet can be generated by the flame blown into the combustion chamber out of the auxiliary chamber through the nozzle holes provided in the sleeve, so that the flame jet can generate the turbulence, which makes rapid combustion possible without the conventional auxiliary chamber type ignition plug. Moreover, the nozzle holes can be provided away from the explosion surface of the piston, so that the flame jet can be prevented from being affected by the temperature of the explosion surface. Furthermore, the auxiliary chamber can be simply formed, so that the auxiliary chamber can be freely designed, the position of ignition can be freely disposed and, thus, the auxiliary chamber that is capable of preventing from being affected by the residual gas can be easily formed.

According to the present invention, the ratio of the height of the auxiliary chamber to the width of the same can be appropriately set, so that the spark ignition engine can be operated with the leaner air-fuel mixture than conventional.

According to the present invention, the position of ignition with the ignition plug can be disposed at an appropriate position to the auxiliary chamber, so that the auxiliary chamber can prevent the residual gas therein from affecting the ignition and combustion performance. Consequently, the stable ignition and combustion can be achieved even with the leaner air-fuel mixture, and thus the available operation range of the engine can be expanded to the lean side.

According to the present invention, the position of ignition with the ignition plug can be disposed at an appropriate position to the auxiliary chamber, so that the auxiliary chamber can prevent the residual gas therein from affecting the ignition and combustion performance. Consequently, the stable ignition and combustion can be achieved even with the leaner air-fuel mixture, and thus the available operation range of the engine can be expanded to the lean side.

According to the present invention, the ratio of the volume of the auxiliary chamber to the volume of the combustion chamber can be appropriately set, so that the stable combustion can be secured and thus the available operation range of the engine can be expanded to the lean side.

According to the present invention, the angles of the nozzle holes make can be appropriately set, so that the stable combustion can be secured as the flame jet is surely blown off out of the nozzle holes and thus the available operation range of the engine can be expanded to the lean side.

According to the present invention, the directions of the nozzle holes can be appropriately set, so that the stable combustion can be secured and thus the available operation range of the engine can be expanded to the lean side.

BRIEF DESCRIPTION OF THE DRAWINGS/FIGURES

FIG. 3(a) is a cross-section plan view of the sleeve in the case in which the directions of the nozzle holes are the same as the directions of the line O1.

FIG. 3(b) is a cross-section plan view of the sleeve in the case in which the directions of the nozzle holes are the same as the directions of the line O2.

DETAILED DESCRIPTION OF THE INVENTION

Figure 1:
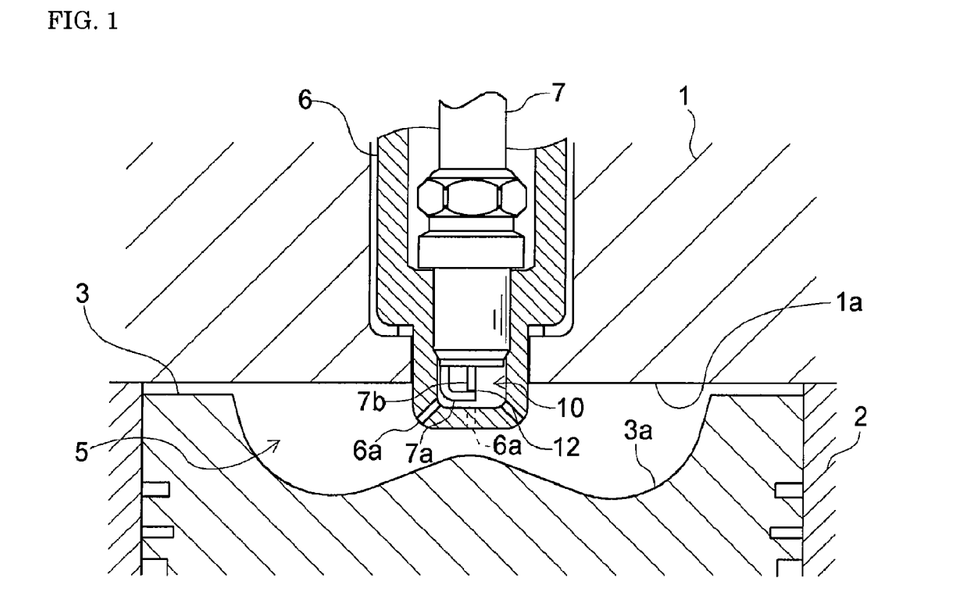
FIG. 1 is a cross-section view of a combustion chamber, an ignition plug and a sleeve according to an embodiment of the present invention.
Figure 2:
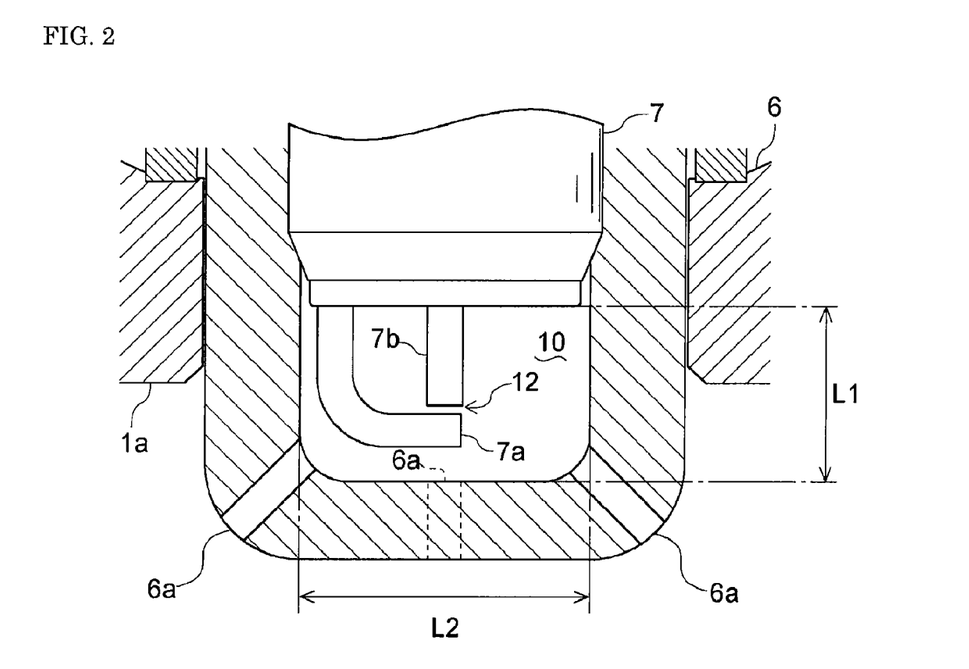
FIG. 2 is a cross-section view of the ignition plug and an auxiliary chamber formed in the sleeve.

In the spark ignition engine according to the present invention, as shown in FIGS. 1 and 2, a cylinder 2 is disposed under a cylinder head 1 and a piston 3 is slidably installed in the cylinder 2 in the vertical direction. A concave-shaped surface 3a is formed at the upper end of the piston 3, facing the cylinder head 1. A combustion chamber 5 is formed as the space surrounded by the cylinder head 1, the cylinder 2 and the concave-shaped surface 3a. An intake valve and an exhaust valve (both not shown) are provided in the cylinder head 1, facing respective valve recesses 3b provided on the piston 3 (see FIG. 3). By opening and shutting the intake valve and the exhaust valve alternately, the intake and exhaust for the combustion chamber 5 can be carried out.

A sleeve 6, which is formed in the blind cylindrical shape, is fitted in the vertical direction at the center of the cylinder head 1 related to the combustion chamber 5. An ignition plug 7 is provided in the sleeve 6. Ignition electrodes (a ground electrode) 7a and (a center electrode) 7b are provided at the lower tip of the ignition plug 7 so as to dispose over the combustion chamber 5. The ignition electrodes 7a and 7b are covered with the bottom of the sleeve 6 projected into the combustion chamber 5. Thus, an auxiliary chamber 10 storing the ignition electrodes 7a and 7b is formed at the bottom part of the sleeve 6.

Figure 3:
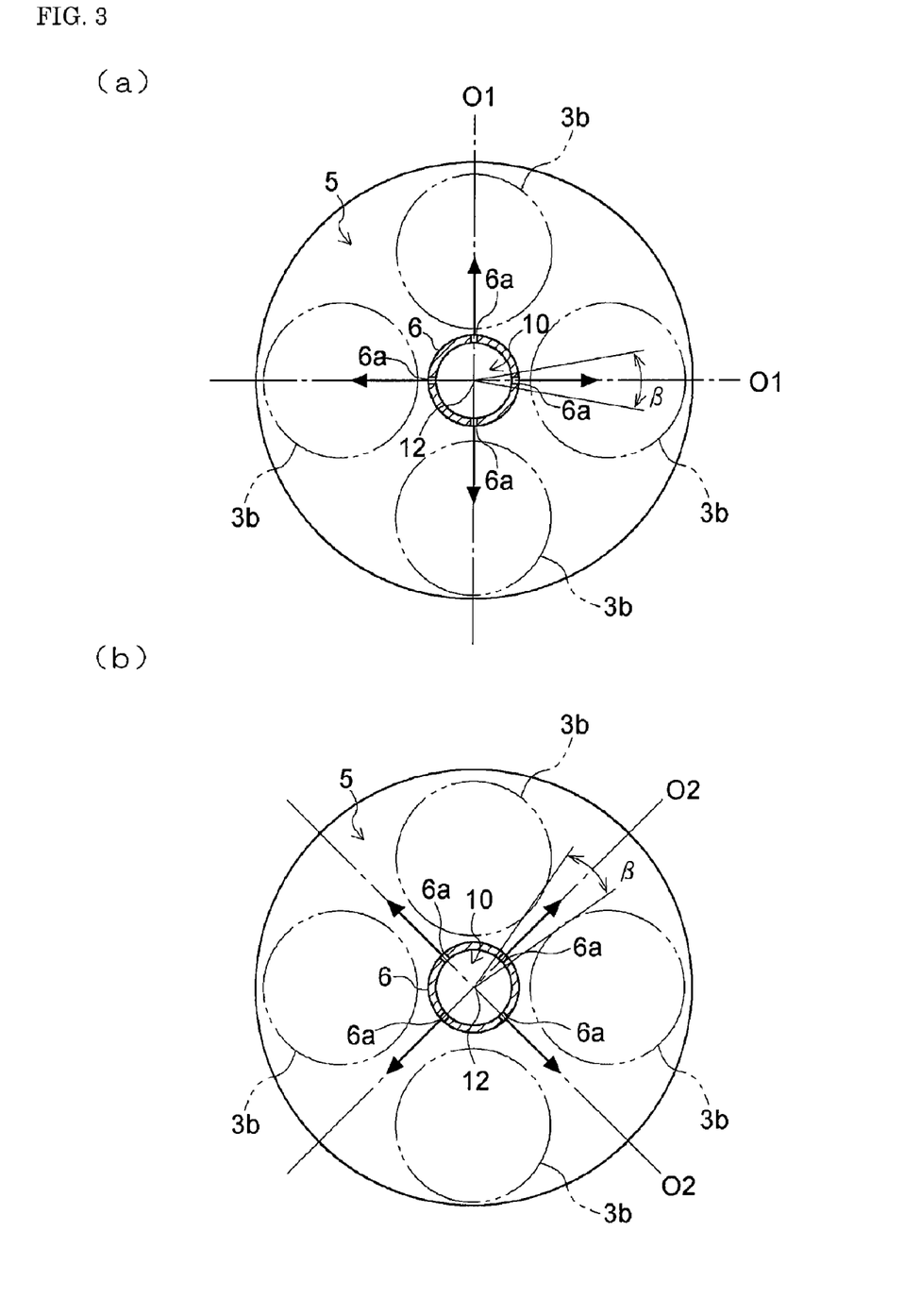
FIG. 3 is a cross-section plan view of the sleeve.

As shown in FIG. 3, the auxiliary chamber 10 is disposed at the center of the combustion chamber 5 viewed from the top and the valve recesses 3b provided on the piston 3 are disposed around the auxiliary chamber 10. The valve recesses 3b serve as a valve recess for the intake valve or for the exhaust valve. In this embodiment, four valve recesses 3b (the two of them are for the intake valve and the remainder for the exhaust valve) are disposed laterally symmetrically related to the auxiliary chamber 10 and arranged every 90 degrees.

Plural nozzle holes 6a are drilled at the lower periphery of the sleeve 6 at equal intervals and thus the auxiliary chamber 10 is communicated with the combustion chamber 5 through the plural nozzle holes 6a. Thus, the air-fuel mixture taken into the cylinder 2 by the intake valve flows into the auxiliary chamber 10 through the plural nozzle holes 6a, and then the air-fuel mixture is spark-ignited by the ignition electrodes 7a and 7b of the ignition plug 7. Hence, the flame is blown into the combustion chamber 5 out of the plural nozzle holes 6a and transmitted.

Here, the bottom part of the sleeve 6 provided with the plural nozzle holes 6a is projected into the combustion chamber 5 and extended lower than an explosion surface 1a (the bottom surface of the cylinder head 1 facing the cylinder 2). In the sleeve 6, the ignition electrodes 7a and 7b of the ignition plug 7 are projected near the explosion surface 1a. Hence, the position 12 of ignition by the ignition electrodes 7a and 7b in the auxiliary chamber 10 is set near the explosion surface 1a in the vertical direction.

Consequently, when the air-fuel mixture in the auxiliary chamber 10 is spark-ignited by the ignition plug 7 in order to achieve the lean burn without another fuel supply, the flame jet can be generated by the flame blown into the combustion chamber 5 out of the auxiliary chamber 10 through the plural nozzle holes 6a provided in the sleeve 6, so that the flame jet can generate the turbulence, which makes rapid combustion possible without the conventional auxiliary chamber type ignition plug. Moreover, the plural nozzle holes 6a can be provided away from the explosion surface 1a, so that the flame jet can be prevented from being affected by the temperature of the explosion surface 1a.

Furthermore, the auxiliary chamber 10 is configured as the space formed between the sleeve 6 and the ignition plug 7, so that the shape thereof is obviously decided. Thus, the auxiliary chamber 10 can be simply formed, so that the auxiliary chamber 10 that is capable of preventing from being affected by the residual gas can be easily formed.

In this embodiment, the auxiliary chamber 10 is formed in the cylindrical shape and the diameter thereof substantially corresponds to the outside diameter of the sleeve 6. As shown in FIG. 2, the height (vertical length) of the auxiliary chamber 10 is defined as a length L1, which is the length from the inside bottom of the sleeve 6 to the bottom of the ignition plug 7 and the diameter (lateral length) of the auxiliary chamber 10 is defined as a length L2, which is equal to the inside diameter of the sleeve 6. The auxiliary chamber 10 is formed in such a way that the relation between the lengths L1 and L2 implements a formula (1).

$$0.5 \leq L1/L2 \leq 1.0 \tag{1}$$

In other words, the ratio L1/L2 of the auxiliary chamber 10 is calculated by dividing the height of the auxiliary chamber 10 by the diameter of the auxiliary chamber 10, and the ratio L1/L2 of the auxiliary chamber 10 is set within the range of 0.5 to 1.0, namely, the auxiliary chamber 10 is formed with the longer side at the top thereof in a cross-section view.

Figure 4:
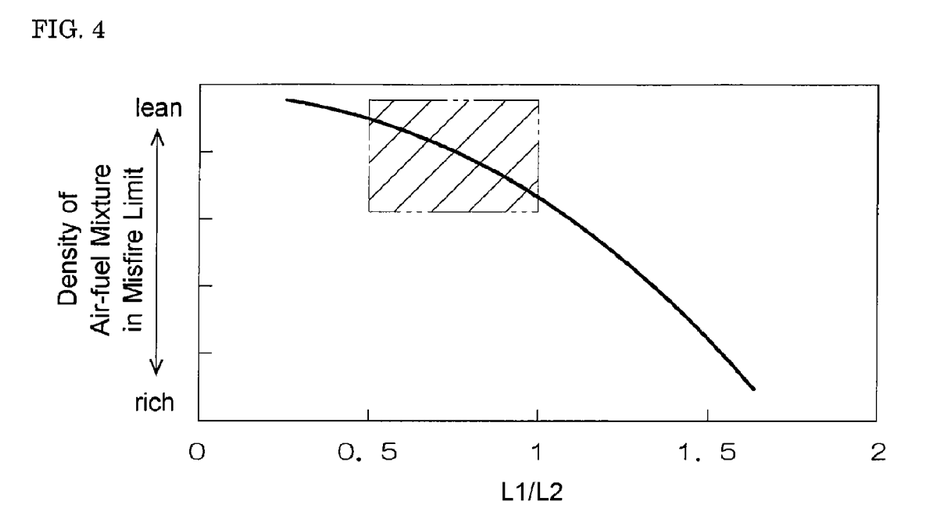
FIG. 4 is a graph showing the relation between the ratio of the height to the width of the auxiliary chamber (i.e. L1/L2) and the density of the air-fuel mixture in misfire limit.

As shown in FIG. 4, the auxiliary chamber 10 is formed as described above, so that the density of the air-fuel mixture in misfire limit when the ratio L1/L2 is small can be leaner than when the ratio is large. In other words, the excess air ratio in misfire limit becomes larger. Thus, the ratio of the auxiliary chamber 10 is set as an appropriate value within the above-mentioned range, so that the engine can be operated with as lean air-fuel mixture as possible.

Figure 5:
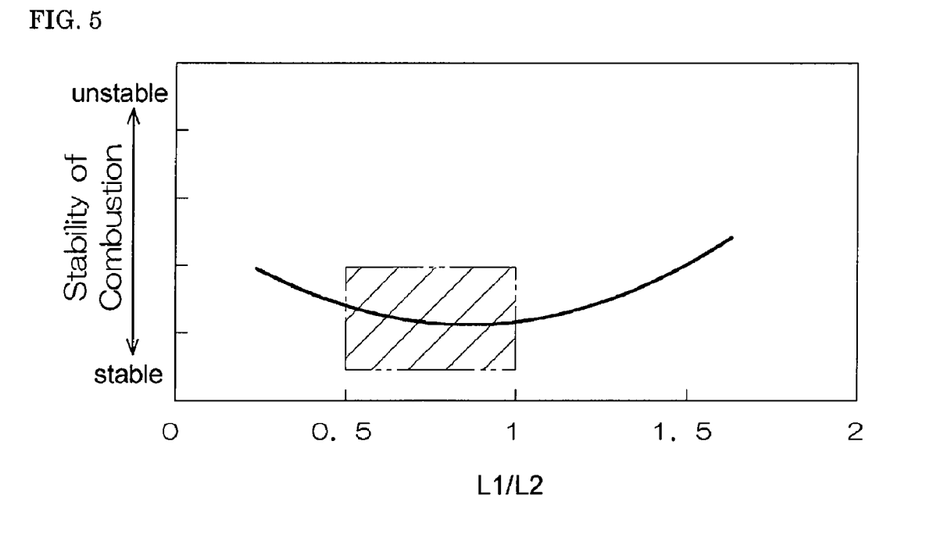
FIG. 5 is a graph showing the relation between the ratio of the height to the width of the auxiliary chamber (i.e. L1/L2) and the stability of combustion.

As shown in FIG. 5, if the ratio L1/L2 of the auxiliary chamber 10 is set within the range of 0.5 to 1.0, then the variation ratio in combustion can become the smallest and the stability of combustion can be increased. Therefore, the stable combustion can be achieved with lean air-fuel mixture, and thus the high-compression operation can be achieved.

If the position of ignition by the ignition electrodes in the auxiliary chamber is conventionally set at the upper part of the auxiliary chamber, namely, at the opposite side to the nozzle holes communicating to the combustion chamber, then much residual gas exists around the position of ignition in the auxiliary chamber before the piston reaches top dead center. Thus, when new air-fuel mixture is flowed into the auxiliary chamber through the nozzle holes, the new air-fuel mixture cannot efficiently reach the position of ignition, affected by the residual gas, and when spark-ignited the stable combustion cannot be achieved.

Figure 6:
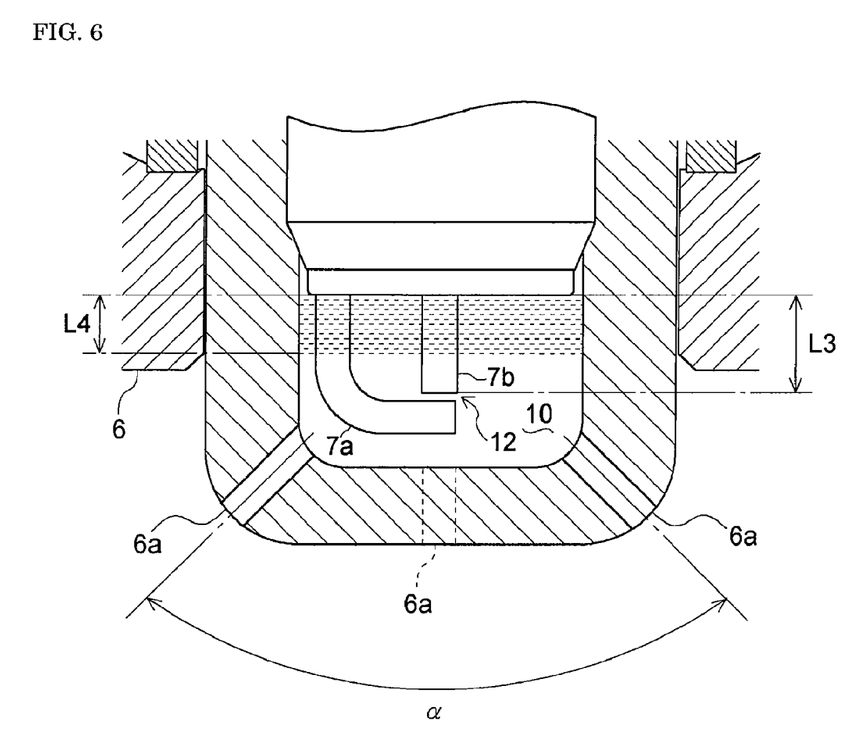
FIG. 6 is a cross-section view of the auxiliary chamber including the residual gas.

In order to secure stable ignition and combustion performance with the lean air-fuel mixture, the position 12 of ignition is set at the appropriate position where the residual gas may not affect combustion performance. As shown in FIG. 6, in the auxiliary chamber 10 set at the appropriate ratio above-mentioned, the ignition electrodes 7a and 7b of the ignition plug 7 are projected into the auxiliary chamber 10 and the position 12 of ignition by the ignition electrodes 7a and 7b is set near the nozzle holes 6a of the sleeve 6 and near the explosion surface 1a.

The position 12 of ignition by the ignition electrodes 7a and 7b is set as discussed below. Concretely, the volume of the residual gas that is remaining in the auxiliary chamber 10 at the ignition timing before the piston 3 reaches top dead center during the compression stroke is calculated. The volume that the calculated volume of the residual gas occupies in the auxiliary chamber 10 is set smaller than the predetermined one. In other words, the volume of the residual gas that is remaining in the auxiliary chamber 10 at the ignition timing before the piston 3 reaches top dead center during the compression stroke is calculated according to a formula (2).

$$\text{Volume of auxiliary chamber} * \text{volume of cylinder at ignition timing (includes volume of auxiliary chamber)/volume of cylinder when intake valve closed (includes volume of auxiliary chamber)} \tag{2}$$

The position 12 of ignition is determined according to the volume of the space over the position 12 of ignition in the auxiliary chamber 10, which is set larger than the volume of the residual gas calculated according to the formula (2). Here, when the piston 3 is pushed up, the residual exhaust gas is compressed upward. The volume of the residual exhaust gas is set smaller than the volume of the space over the position 12 of ignition in the auxiliary chamber 10, so that the residual exhaust gas can be positioned over the position of ignition when spark-ignited. Consequently, the combustion in the auxiliary chamber 10 can be prevented from being affected.

The volume of the space over the position 12 of ignition in the auxiliary chamber 10 can be calculated on the basis of a length L3 between the top of the auxiliary chamber (the bottom of the ignition plug 7) and the position 12 of ignition and the length L2 (the diameter of the auxiliary chamber 10). Here, the bottom area is common. Therefore, the value calculated by dividing the volume of residual gas by the bottom area is set shorter than the length L3.

In other words, at the ignition timing before the piston 3 reaches top dead center, if the position of ignition is set appropriately, then the length L3 between the top of the auxiliary chamber 10 and the position 12 of ignition is set longer than a length L4 between the upper end of the auxiliary chamber 10 and the lower end of the residual gas existing in the auxiliary chamber 10 (i.e. L3>L4).

Thus, the position 12 of ignition of the air-fuel mixture by the ignition electrodes 7a and 7b of the ignition plug 7 is set nearer the nozzle holes 6a than the residual gas remaining in the auxiliary chamber 10. Therefore, the position 12 of ignition by the ignition plug 7 can be set at the appropriate position in the auxiliary chamber 10, so that the ignition and combustion performance can be prevented from being affected by the residual gas in the auxiliary chamber 10. Consequently, the stable ignition and combustion can be achieved even with the leaner air-fuel mixture, and thus the available operation range of the engine can be expanded to the lean side.

Concretely, the position 12 of ignition is set against the auxiliary chamber 10 in such a way that the relation between the length L3 between the inside upper surface of the auxiliary chamber 10 and the position 12 of ignition and the length L1 defined as the height of the auxiliary chamber 10 has a formula (3).

$$0.5 \leq L3/L1 \leq 0.8 \tag{3}$$

In other words, the value L3/L1 calculated by dividing the length L3 by the length L1 is set within the range of 0.5 to 0.8.

Figure 7:
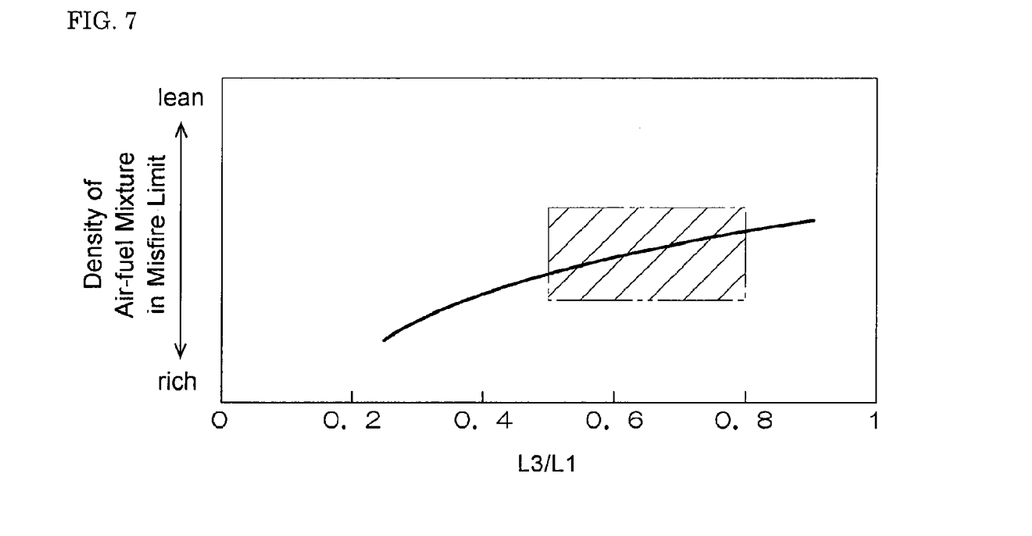
FIG. 7 is a graph showing the relation between the ratio of the length from the top of the auxiliary chamber to the position of ignition to the height of the auxiliary chamber (i.e. L3/L1) and the density of the air-fuel mixture in misfire limit.

In this case, as shown in FIG. 7, the density of the air-fuel mixture in misfire limit when the calculated value L3/L1 is large can be leaner than when the value L3/L1 is small. In other words, the excess air ratio in misfire limit becomes larger. Thus, the calculated value L3/L1 is set at an appropriate value within the above-mentioned range and the position 12 of ignition is set against the auxiliary chamber 10, so that the engine can be operated with as lean air-fuel mixture as possible.

Figure 8:
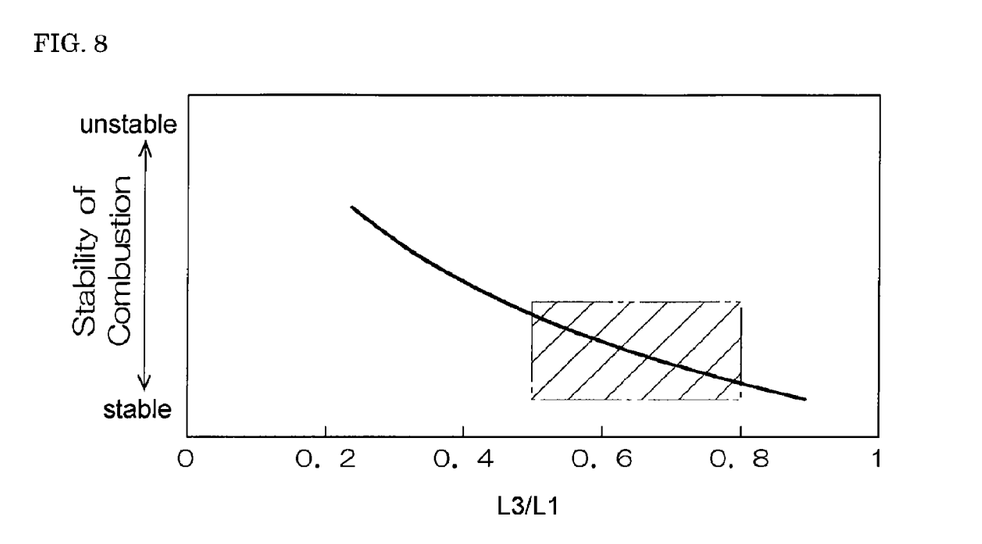
FIG. 8 is a graph showing the relation between the ratio of the length from the top of the auxiliary chamber to the position of ignition to the height of the auxiliary chamber (i.e. L3/L1) and the stability of combustion.

As shown in FIG. 8, if the density of the air-fuel mixture in misfire limit is constant, then when the calculated value L3/L1 is large the stability of combustion can be increased and the variation ratio in combustion can become smaller than when the value L3/L1 is small. Therefore, the stable combustion can be achieved with lean air-fuel mixture, and thus the high-compression operation can be achieved.

A volume V1 is defined as the volume of the auxiliary chamber 10 and a volume V2 is defined as the volume of the combustion chamber 5 when the piston 3 reaches top dead center. The relation between the volume V1 and V2 has a formula (4).

$$0.010 \leq V1/V2 \leq 0.015 \quad (4)$$

In other words, the ratio V1/V2 is calculated by dividing the volume V1 by the volume V2 and the ratio V1/V2 is set within the range of 0.010 to 0.015.

Figure 9:
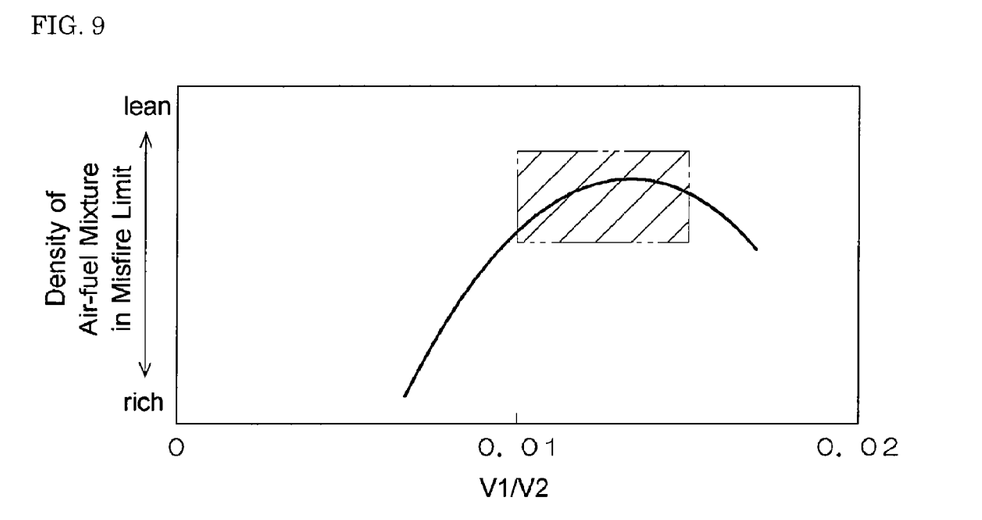
FIG. 9 is a graph showing the relation between the ratio of the volume of the auxiliary chamber to that of the combustion chamber (i.e. V1/V2) and the density of the air-fuel mixture in misfire limit.

In the auxiliary chamber 10, as shown in FIG. 9, if the ratio V1/V2 is set within the range of 0.010 to 0.015, then the density of the air-fuel mixture becomes leanest in misfire limit. In other words, the excess air ratio in misfire limit becomes larger. Thus, the volume ratio of the auxiliary chamber to the combustion chamber is set as an appropriate value within the above-mentioned range, so that the engine can be operated with as lean air-fuel mixture as possible.

Figure 10:
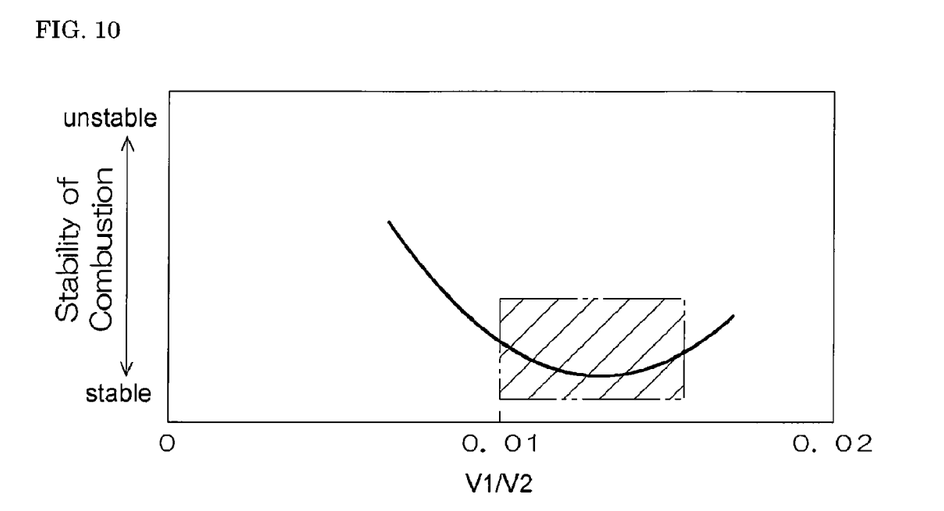
FIG. 10 is a graph showing the relation between the ratio of the volume of the auxiliary chamber to that of the combustion chamber (i.e. V1/V2) and the stability of combustion.

As shown in FIG. 10, if the ratio V1/V2 is set within the range of 0.010 to 0.015, then the variation ratio in combustion can become the smallest and the stability of combustion can be increased. Therefore, the stable combustion can be achieved with lean air-fuel mixture, and thus the high-compression operation can be achieved.

The auxiliary chamber 10 is formed as above-mentioned, whereas the plural nozzle holes 6a are drilled at the bottom of the sleeve 6 in such a way that there are plural pairs of two nozzle holes 6a drilled in the diameter direction. That is to say, the plural pairs of two nozzle holes 6a are set symmetrically relative to the position 12 of ignition by the ignition plug 7. Moreover, the nozzle holes 6a are formed inclined downward toward the outer periphery of the combustion chamber 5 and the flame jet can be blown radially into the combustion chamber 5 out of the auxiliary chamber 10 through the nozzle holes 6a. Furthermore, as shown in FIG. 6, the angle α that each of the pair of nozzle holes 6a makes in the gravity direction is set within the range of 80 to 100 degrees.

Figure 11:
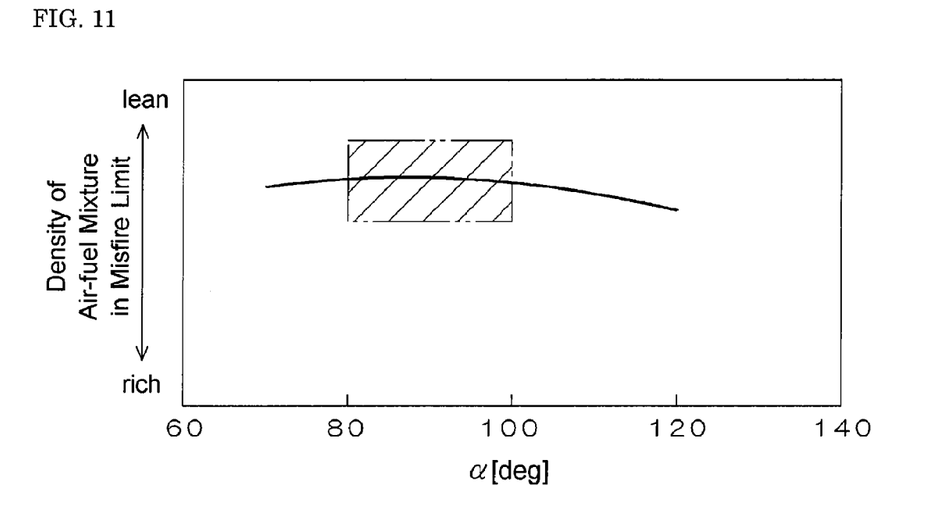
FIG. 11 is a graph showing the relation between the angles of the nozzle holes (i.e. the angle $\alpha$) and the density of the air-fuel mixture in misfire limit.

As shown in FIG. 11, if the angle α is set within the range of 80 to 100 degrees, then the density of the air-fuel mixture becomes leanest in misfire limit. In other words, the excess air ratio in misfire limit becomes larger. Thus, the angle α is set at the appropriate value within the above-mentioned range, so that the engine can be operated with as lean air-fuel mixture as possible.

Figure 12:
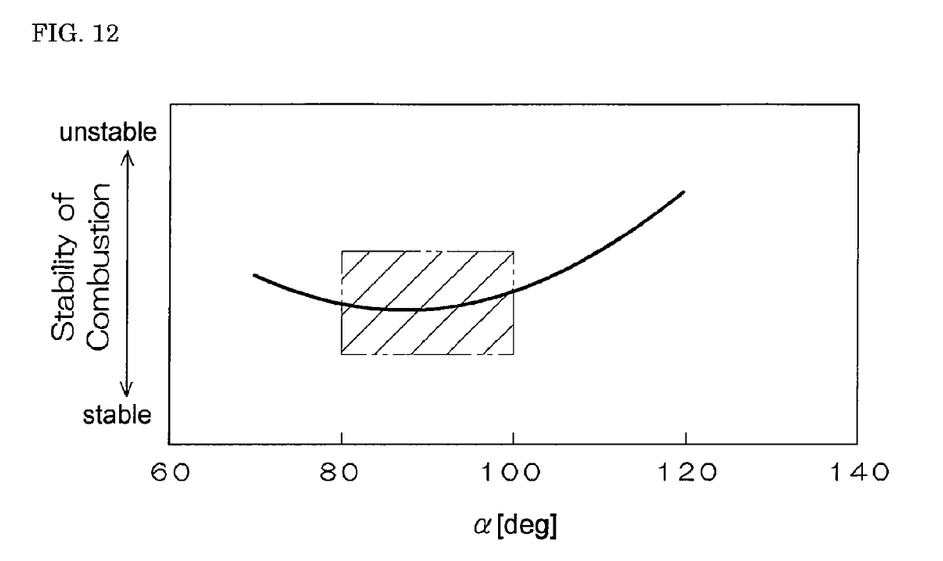
FIG. 12 is a graph showing the relation between the angles of the nozzle holes (i.e. the angle $\alpha$) and the stability of combustion.

As shown in FIG. 12, if the angle α is set within the range of 80 to 100 degrees, then the variation ratio in combustion can become smaller and the stability of combustion can be increased to the best. Therefore, the stable combustion can be achieved with lean air-fuel mixture, and thus the high-compression operation can be achieved.

Moreover, the pairs of nozzle holes 6a are spaced at equal intervals related to the position 12 of ignition by the ignition plug 7 in a top view. In this embodiment, two pairs of nozzle holes 6a are drilled and arranged every 90 degrees. In other words, four nozzle holes are drilled and arranged every 90 degrees at the bottom periphery of the auxiliary chamber 10.

The directions of drilling the nozzle holes are set in such a way that, as shown in FIG. 3(a), each of the blowout direction of the flame jet out of the nozzle hole 6a points to each center of the valve recess 3b (the directions of the nozzle holes are the same as the directions of the line O1). In an alternative embodiment, as shown in FIG. 3(b), the directions of the nozzle holes are set in such a way that each of the blowout direction of the flame jet out of the nozzle hole 6a points to each center between the two adjacent valve recesses 3b (the directions of the nozzle holes are the same as the directions of the line O2).

Moreover, a tolerance angle β that the drilling direction of the nozzle hole 6a and the line O1 or O2 makes is set within the range of −10 to 10 degrees in the horizontal direction. Furthermore, the directions of drilling the nozzle holes 6a are determined according to the shape of the combustion chamber 5 whether the directions of the line are O1 or O2. Here, the arrows in FIGS. 3(a) and 3(b) show the blowout directions of the flame jets blown off out of the nozzle holes 6a.

Figure 13:
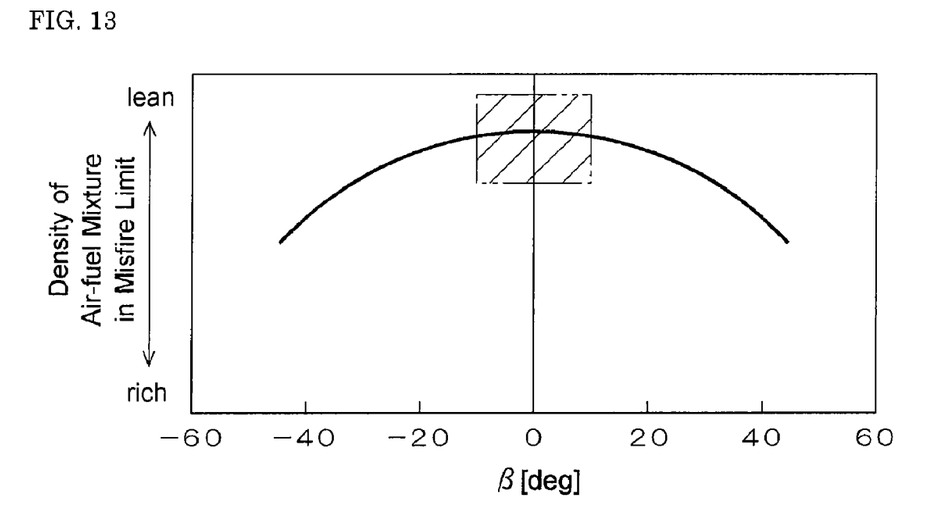
FIG. 13 is a graph showing the relation between the direction of the nozzle holes (i.e. the angle $\beta$) and the density of the air-fuel mixture in misfire limit.

As shown in FIG. 13, if the directions of drilling the nozzle holes 6a is set as the directions of the line O1 or O2 and the tolerance angle β0 is set within the range of −10 to 10 degrees in the horizontal direction, then the density of the air-fuel mixture becomes leanest in misfire limit. In other words, the excess air ratio in misfire limit becomes larger. Thus, the directions of drilling the nozzle holes 6a are set at the appropriate value within the above-mentioned range, so that the engine can be operated with as lean air-fuel mixture as possible.

Figure 14:
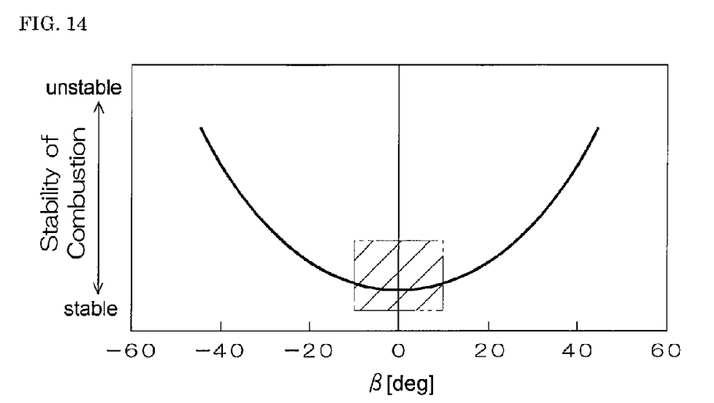
FIG. 14 is a graph showing the relation between the direction of the nozzle holes (i.e. the angle $\beta$) and the stability of combustion.

As shown in FIG. 14, if the tolerance angle β is set within the range of −10 to 10 degrees, then the variation ratio in combustion can become smaller and the stability of combustion can be increased. Therefore, the stable combustion can be achieved with lean air-fuel mixture, and thus the high-compression operation can be achieved.

INDUSTRIAL APPLICABILITY

According to the present invention, the spark ignition engine can be suitably applicable to spark ignition engines comprising the single chamber type combustion chamber.

The invention claimed is:
1. A spark ignition engine comprising:
a cylinder;
a cylinder head;
a piston;
a sleeve formed in a blind cylindrical shape;
an auxiliary chamber formed at a bottom part of the sleeve;
an ignition plug fitted to the cylinder head through the sleeve;
a set of ignition electrodes for the ignition plug facing a single chamber type combustion chamber in the cylinder; and
one or more nozzle holes allowing the auxiliary chamber to communicate with the combustion chamber, wherein:
the bottom of the sleeve is projected to the inside of the combustion chamber from an explosion surface of the cylinder head;

an ignition position of the ignition electrodes is set near the explosion surface;

the ignition position is configured to be in a position lower than a residual gas that remains in the auxiliary chamber at a time of ignition before the piston reaches top dead center; and a ratio of a volume of the auxiliary chamber to that of the combustion chamber when the piston reaches top dead center is set within a range of 0.010 to 0.015.

2. The spark ignition engine according to claim 1, wherein the nozzle holes are set so that one or more pairs of the holes are symmetrical relative to the ignition position, and wherein an angle that each of the pair of the holes makes in a gravity direction is set within a range of 80 to 100 degrees.

3. The spark ignition engine according to claim 1, wherein directions of the nozzle holes are set as directions of lines between the ignition position and centers of valve recesses provided in an outer periphery of the combustion chamber or centers of the valve recesses adjacent to each other, and wherein tolerance angles that directions of the nozzle holes and directions of the lines make are set within a range of −10 to 10 degrees in a horizontal direction.

* * * * *